United States Patent
Fournie et al.

(10) Patent No.: US 8,926,245 B2
(45) Date of Patent: Jan. 6, 2015

(54) ASSEMBLY COMPRISING A DEVICE FOR LOCKING A FASTENING

(71) Applicant: Airbus Operations SAS, Toulouse (FR)

(72) Inventors: Jacques Fournie, Grenade (FR); Thony Dupas, Toulouse (FR)

(73) Assignee: Airbus Operations SAS (FR)

( * ) Notice: Subject to any disclaimer, the term of this patent is extended or adjusted under 35 U.S.C. 154(b) by 0 days.

(21) Appl. No.: 13/960,274

(22) Filed: Aug. 6, 2013

(65) Prior Publication Data

US 2014/0037400 A1  Feb. 6, 2014

(30) Foreign Application Priority Data

Aug. 6, 2012 (FR) ..................... 12 57640

(51) Int. Cl.
*F16B 39/24* (2006.01)
*F16B 39/32* (2006.01)
*F16B 39/10* (2006.01)

(52) U.S. Cl.
CPC ................ *F16B 39/24* (2013.01); *F16B 39/32* (2013.01); *F16B 39/10* (2013.01)
USPC ....................................................... 411/132

(58) Field of Classification Search
CPC ........ F16B 39/10; F16B 39/32; F16B 39/105; F16B 39/108
USPC .................. 411/103, 132, 141, 143
See application file for complete search history.

(56) References Cited

U.S. PATENT DOCUMENTS

| | | | | | |
|---|---|---|---|---|---|
| 2,346,712 | A | * | 4/1944 | Tinnerman | 248/71 |
| 2,384,508 | A | * | 9/1945 | Tinnerman | 411/103 |
| 2,404,372 | A | * | 7/1946 | Hallock | 411/113 |
| 2,407,609 | A | * | 9/1946 | Judd et al. | 411/103 |
| 2,409,209 | A | * | 10/1946 | Johnson | 411/111 |
| 2,451,991 | A | * | 10/1948 | Swanstrom | 411/103 |
| 4,193,435 | A | * | 3/1980 | Frosch et al. | 411/113 |
| 5,022,804 | A | * | 6/1991 | Peterson | 411/104 |
| 5,209,619 | A | * | 5/1993 | Rinderer | 411/85 |
| 7,527,464 | B2 | * | 5/2009 | Stewart et al. | 411/107 |

FOREIGN PATENT DOCUMENTS

EP    0 774 399 A1    5/1997
GB    230 282 A       3/1925

\* cited by examiner

*Primary Examiner* — Roberta Delisle
(74) *Attorney, Agent, or Firm* — Lerner, David, Littenberg, Krumholz & Mentlik, LLP

(57) ABSTRACT

An assembly includes a support fastened to a structure by a fastening element extending along a fastening axis. and includes a bore for the passage of the fastening element. The fastening element includes a surface for driving in rotation. The assembly includes a device for locking the fastening element in rotation including a moveable end resting against the surface for driving in rotation the fastening element. The locking device is configured so that, at rest, the moveable end enters into the volume normally occupied by the surface of the fastening element. The locking device is placed between the support and the fastening element so as to be deformed elastically by the surface when the fastening element is put in place in the bore of the support. The moveable end includes locking shapes capable of interacting with the external shapes of the driving surface to stop the fastening element from rotating.

11 Claims, 2 Drawing Sheets

ASSEMBLY COMPRISING A DEVICE FOR LOCKING A FASTENING

FIELD OF THE INVENTION

The present invention relates to an assembly in which a fastening element used to fastening a support to a structure must be locked in rotation.

BACKGROUND OF THE INVENTION

An aircraft comprises several external aerodynamic parts such as the radome and other external cowlings which are mounted so as to move relative to the fixed structure formed by the fuselage.

Because of their external position, these parts sustain considerable mechanical forces including the aerodynamic forces that are applied in flight to the fuselage of the aircraft.

Consequently, these moveable external parts must be solidly and firmly connected to the fixed structure of the aircraft, notably when the latter is in use.

Accordingly, standard fastening elements such as screws are used, their number and their distribution being adapted to ensure a rigid connection.

In order to ensure the durability of the assembly during the operation of the aircraft, the fastening screws must be locked by means preventing their unscrewing.

However, according to an assembly constraint, and always because of the external position of these moveable parts, the fastening screws are accessible only from the outside of the aircraft and only at one of their ends: only the screw head or the nut mounted on the screw can be reached.

Also, conventional locking means of the lock nut type cannot be used because these means wear in the long term.

The use of tab washers is no more suitable because the tabs may present risks of breakage after a certain number of removals and reinstallations.

Finally, the use of safety wire cannot be envisaged because of the number of screws and the considerable time needed to take the necessary precautions when removing and reinstalling the safety wire.

According to other assembly constraints, the fastening elements must be reusable, and, as much as possible, fulfill their function throughout the service life of the aircraft.

And, according to recent assembly constraints, these fastening elements are situated in a lightning hazard attachment zone and they must allow the production of a compact assembly.

Also, the present invention aims to respond to the aforementioned assembly constraints and to alleviate the drawbacks of the prior art.

BRIEF SUMMARY OF THE INVENTION

Accordingly, an embodiment of the invention is an assembly comprising a support fastened to a structure by means of a fastening element extending along a fastening axis, the support comprising a bore for the passage of the fastening element, the fastening element comprising a surface for driving in rotation, and the assembly comprising a device for locking in rotation the fastening element, the locking device comprising a moveable end resting against the surface for driving in rotation the fastening element when the latter is put in place in the bore of the support, and the locking device being designed so that, at rest, that is to say when the fastening element is not present in the bore of the support, the moveable end enters into the volume normally occupied by the surface for driving in rotation the fastening element when the latter is put in place in the bore of the support.

According to an embodiment of the invention, the assembly is characterized in that the locking device is placed between the support and the fastening element so as to be deformed elastically by the surface for driving in rotation when the fastening element is put in place in the bore of the support, and in that the moveable end comprises locking shapes capable of interacting with the external shapes of the driving surface in order to stop the fastening element from rotating about the fastening axis.

By producing locking combining an elastic deformation and locking shapes, the locking device of the assembly according to an embodiment of the invention can be reused as many times as necessary.

Moreover, by virtue of its fastening means and its deformation capability, the locking device remains in place and requires no mounting precaution.

BRIEF DESCRIPTION OF THE DRAWINGS

Other features and advantages will emerge from the following description of the invention, a description given only as an example, with respect to the appended drawings in which.

DETAILED DESCRIPTION

Figure 1:
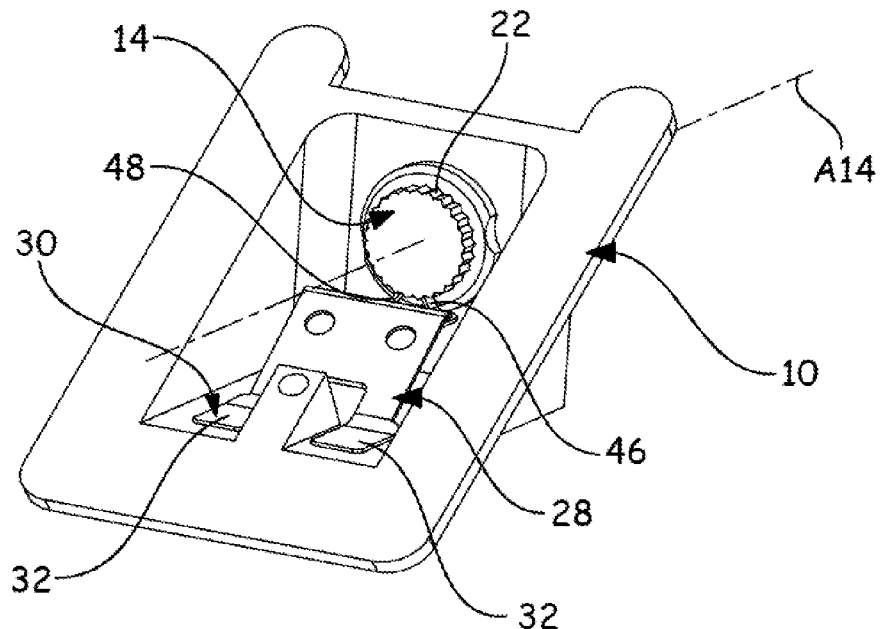
FIG. 1 is a representation in perspective slightly to the side of an assembly comprising a locking device according to an embodiment of the invention.
Figure 2:
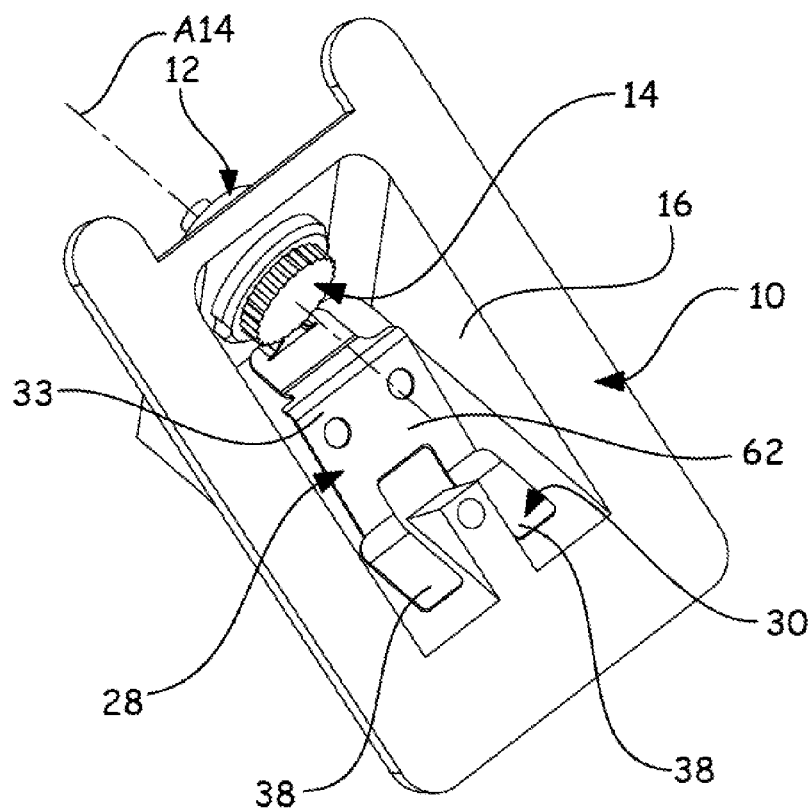
FIG. 2 is a representation in perspective slightly from above of an assembly comprising a locking device according to an embodiment of the invention.

As illustrated by FIGS. 1 and 2, the present invention relates to an assembly comprising a support 10 fastened to a structure 12 by means of a fastening element 14.

In the example shown in FIGS. 1 to 5, the support 10 is a housing 16 that can be incorporated on the periphery of a moveable part of an aircraft, such as a radome or another external cowling with aerodynamic shapes, in order to connect this moveable part to the structure of the aircraft fuselage.

Still in the example illustrated in FIGS. 1 to 5, the structure 12 is represented by a nut 18, this nut usually being machined or fastened in the fuselage structure of the aircraft during its manufacture.

The present invention also covers applications of the assembly described below to fields other than aeronautics.

In order to produce this assembly, a standard fastening element 14 is preferably used taking the form of a screw, the support 10 comprising a bore 20 for the passage of this fastening element 14.

Also, in a known manner, this fastening element 14 extends along a fastening axis A14 and it comprises a surface 22 for driving in rotation at one of its ends.

In order to be driven in rotation by an appropriate tool, this surface 22 for driving in rotation comprises at least two distinct external faces (24, 26), that is to say faces that are separated by sharp edges.

Preferably, this surface 22 for driving in rotation is hexagonal or bi-hexagonal.

In order to ensure a rigid and durable fastening of the support 10 to the structure 12, the assembly comprises a locking device 28 to prevent the fastening element 14 from rotating.

According to an embodiment of the invention, the locking device 28 is placed between the support 10 and the fastening element 14 so as to be deformed elastically by the surface 22 for driving in rotation when the fastening element 14 is put in place in the bore 20 of the support 10.

Thus, by virtue of an appropriate placement of the locking device 28 relative to the surface 22 for driving in rotation the fastening element 14, a plastic deformation of the locking device 28 is avoided so that the locking device retains its elasticity and remains reusable after many removals and reinstallations of the assembly.

In order to be held in the appropriate position relative to the surface 22 for driving in rotation the fastening element 14, the locking device 28 is secured to the support 10 by its own fastening means 30.

Thus, the positioning of the locking device 28 is independent of the putting in place of the fastening element 14.

In parallel, and by virtue of its fastening means 30, the locking device 28 operates by being deformed independently of the tightening torque of the fastening element 14, which is not the case with elastic washers for example.

For its fastening means 30, the locking device 28 comprises a fixed end 32 secured to the support 10, the remaining portion of the locking device 28 forming the moveable portion 33 of the latter.

In order to allow a displacement of the locking device 28 relative to the surface 22 for driving in rotation, the fixed end 32 of the locking device 28 is offset relative to the fastening axis A14.

More precisely, the offset D of the fixed end 32 of the locking device 28 relative to the fastening axis A14 is such that it allows an elastic deformation of the locking device 28 relative to the surface 22 for driving in rotation.

In a preferred embodiment of the assembly according to the invention, designed to obtain a compact assembly, the support 10 comprises a lateral face 34 perpendicular to a main face 36 through which the fastening bore 20 is produced, and the fixed end 32 of the locking device 28 is secured to this lateral face 34 of the support.

In this preferred embodiment, the offset D of the fixed end 32 of the locking device 28 comprises two components: a lateral component D1 perpendicular to the fastening axis A14 and corresponding to the distance between the fastening axis A14 and the lateral face 34, and a longitudinal component D2 parallel to the fastening axis A14 and corresponding to the distance between the main face 36 and the fixed end 32.

Preferably, the fixed end 32 is welded or riveted to the support 10. However, other fastening means can be envisaged, and the variants that arise therefrom are covered by the present invention.

In order to implement this fastening, in the preferred embodiment of the assembly with an offset D of the fixed end 32 with two components (D1, D2), the fixed end 32 takes the form of at least one fastening lug 38 folded relative to the moveable portion 33 of the locking device 28.

Thus, the locking device 28 is deformed mainly in the portion 40 where the fixed end 32 and the moveable portion 33 join.

Figure 4:
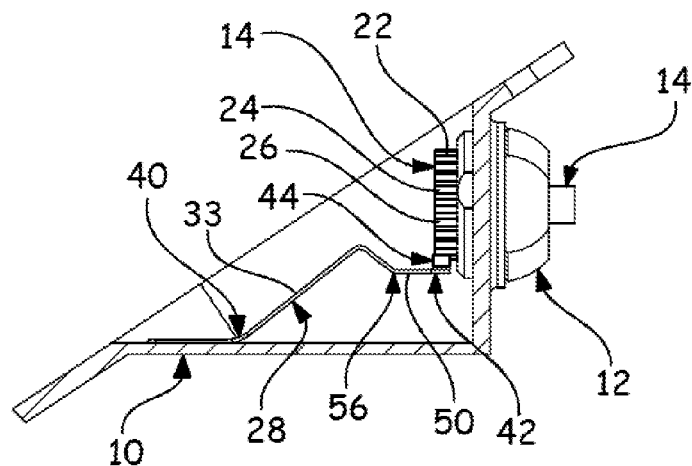

As illustrated by FIG. 4, and in order to achieve the locking in rotation of the fastening element 14, the locking device 28 comprises a moveable end 42 resting against the surface 22 for driving in rotation the fastening element 14 when the latter is put in place in the bore 20 of the support 10.

Figure 3:
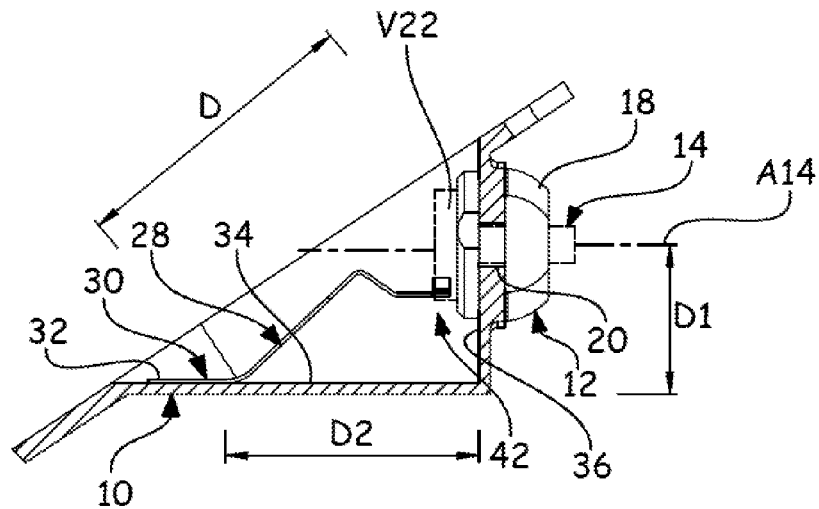
FIGS. 3 to 5 illustrate the operating principle of the locking device according to an embodiment of the invention.

In order to keep the moveable end 42 pressed against the surface 22 for driving in rotation the fastening element 14 when it is placed in the bore 20 of the support 10, and as illustrated by dashed lines in FIG. 3, the locking device 28 is designed such that, at rest, that is to say when the fastening element 14 is not present in the bore 20 of the support 10, the moveable end 42 enters into the volume V22 normally occupied by the surface 22 for driving in rotation the fastening element 14 when the latter is put in place in the bore 20 of the support 10.

According to an important feature of the present invention, the moveable end 42 comprises locking shapes capable of interacting with the external shapes of the driving surface 22 in order to stop the fastening element 14 from rotating about the fastening axis A14.

In greater detail, the locking shapes of the moveable end 42 rest under pressure on the external shapes of the surface 22 for driving in rotation the fastening element 14.

This pressure is due to the mechanical strength and to the elasticity of the material from which the locking device 28 is made, this mechanical strength and this elasticity opposing the deformation of the locking device 28 by the surface 22 for driving in rotation when the fastening element 14 is put in place in the bore 20 of the support 10.

Preferably, since the surface 22 for driving in rotation the fastening element 14 is not of revolution, the locking shapes of the moveable end 42 consist of locking lugs 44 capable of interacting with the external shapes of the driving surface 22 for stopping the fastening element 14 from rotating about the attachment axis A14.

In a preferred embodiment of the locking device 28, the locking lugs 44 take the form of two folds of material 46, 48 cut out of the moveable end 42, rising to the surface 22 for driving in rotation the fastening element 14 and facing one another.

Still in a preferred embodiment of the locking device 28, and so that the locking lugs 44 come perpendicularly into contact against the surface 22 for driving in rotation the fastening element 14, the moveable end 42 takes the form of a portion 50 that is flat and parallel to the fastening axis A14, the flat portion 50 being obtained by the production of a first fold 56 relative to the rest of the moveable portion 33 of the locking device 28.

Figure 5:
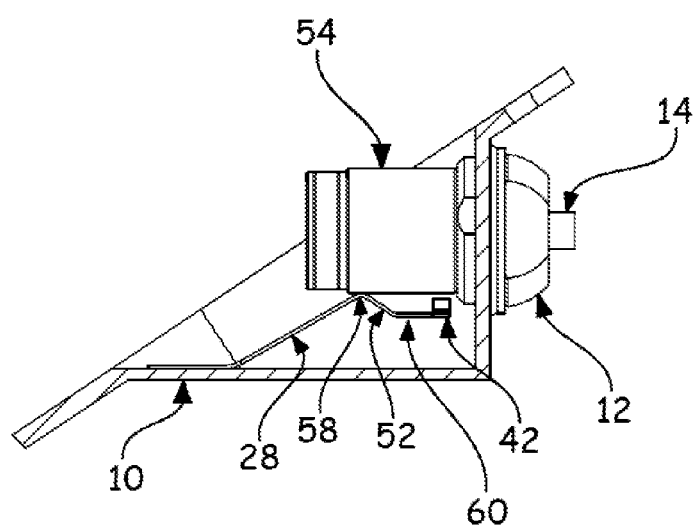

Additionally in the design of the locking device 28, the moveable end 42 is preceded by a raised portion 52 making it possible to move the moveable end 42 away from the surface 22 for driving in rotation when a rotation-driving tool 54 is placed on the said surface 22, as illustrated in FIG. 5.

In a preferred embodiment of the locking device 28, the moveable end 42 taking the form of a portion 50 obtained by the production of a first fold 56 relative to the rest of the moveable portion 33 of the locking device 28, the raised portion 52 is obtained by the production of a second fold 58 preceding the first fold 56.

More precisely, the second fold 58 and the first fold 56 make it possible to form a setback 60 making it possible to distance the portion 50 from the fastening axis 14, and hence from the surface 22 for driving in rotation.

Still in a preferred and illustrated embodiment of the locking device 28, this locking device 28 takes the form of a metal strip 62, the thickness and the material of this metal strip 62 being chosen as a function of the desired locking force on the surface 22 for driving in rotation.

Finally, the present invention covers an aircraft comprising an assembly as has just been described between a moveable part and a structural part, the support 10 being able, for example, to be incorporated into the moveable part and the structural part being integrated in the structure 12.

The invention claimed is:
1. An assembly comprising:
a support fastened to a structure by a fastening element extending along a fastening axis,
wherein the support comprises a bore for the passage of the fastening element, wherein the fastening element comprises a surface for driving in rotation, and wherein the assembly further comprises a device for locking in rotation the fastening element, the locking device comprising a moveable end resting against the surface for driving in rotation the fastening element when the fastening element is put in place in the bore of the support, wherein the locking device is configured so that, at rest, that is to say when the fastening element is not present in the bore of the support, the moveable end enters into the volume normally occupied by the surface for driving in rotation the fastening element when the fastening element is put in place in the bore of the support, wherein the locking device is configured to be placed between the support and the fastening element so as to be deformed elastically by the surface for driving in rotation when the fastening element is put in place in the bore of the support, wherein the moveable end comprises locking at least one locking shape configured to interact with the external shapes of the driving surface to stop the fastening element from rotating about the fastening axis, and wherein the locking device is secured to the support by its own fastening means.

2. The assembly according to claim 1, wherein the at least one locking shape of the moveable end rest under pressure on the external shapes of the surface for driving in rotation the fastening element.

3. The assembly according to claim 1, wherein, since the surface for driving in rotation the fastening element is not of revolution, the moveable end comprises locking lugs configured to interact with the external shapes of the driving surface to stop the fastening element from rotating about the fastening axis.

4. The assembly according to claim 3, wherein the locking lugs take the form of first and second folds of materials cut in the moveable end, rising to the surface for driving in rotation the fastening element and facing one another.

5. The assembly according to claim 1, wherein the locking device comprises a fixed end secured to the support, the remaining portion of the locking device forming the moveable portion of the locking device.

6. The assembly according to claim 1, wherein the fixed end of the locking device is offset relative to the fastening axis, the offset of the fixed end of the locking device relative to the fastening axis being such that it allows an elastic deformation of the locking device relative to the surface for driving in rotation.

7. The assembly according to claim 6, wherein the support comprises a lateral face perpendicular to a main face through which the fastening bore is made, and wherein the fixed end of the locking device is secured to the lateral face of the support, the offset of the fixed end of the locking device comprising two components: a lateral component perpendicular to the fastening axis and corresponding to the distance between the fastening axis and the lateral face, and a longitudinal component parallel to the fastening axis and corresponding to the distance between the main face and the fixed.

8. The assembly according to claim 7, wherein the moveable end is preceded by a raised portion making it possible to move the moveable end away from the surface for driving in rotation when a rotation-driving tool is placed on the said surface.

9. The assembly according to claim 1, wherein the locking device comprises a metal strip, the thickness and the material of the metal strip being chosen as a function of the desired locking force on the surface for driving in rotation.

10. An aircraft comprising an assembly between a moveable part and a structural part, the assembly comprising:

a support fastened to the structural part by a fastening element extending along a fastening axis, wherein the support comprises a bore for the passage of the fastening element, wherein the fastening element comprises a surface for driving in rotation, and wherein the assembly further comprises a device for locking in rotation the fastening element, the locking device comprising a moveable end resting against the surface for driving in rotation the fastening element when the fastening element is put in place in the bore of the support, wherein the locking device is configured so that, at rest, that is to say when the fastening element is not present in the bore of the support, the moveable end enters into the volume normally occupied by the surface for driving in rotation the fastening element when the fastening element is put in place in the bore of the support, wherein the locking device is configured to be placed between the support and the fastening element so as to be deformed elastically by the surface for driving in rotation when the fastening element is put in place in the bore of the support, and wherein the moveable end comprises locking at least one locking shape configured to interact with the external shapes of the driving surface to stop the fastening element from rotating about the fastening axis, and wherein the locking device is secured to the support by its own fastening means.

11. A method for producing an assembly comprising:

a support fastened to a structure by a fastening element extending along a fastening axis, wherein the support comprises a bore for the passage of the fastening element, wherein the fastening element comprises a surface for driving in rotation, and wherein the assembly further comprises a device for locking in rotation the fastening element, the locking device comprising a moveable end resting against the surface for driving in rotation the fastening element when the fastening element is put in place in the bore of the support, wherein the method comprises:

placing the locking device so that the moveable end enters into the volume normally occupied by the surface for driving in rotation the fastening element when the fastening element is put in place in the bore of the support, and between the support and the fastening element so as to be deformed elastically by the surface for driving in rotation when the fastening element is put in place in the bore of the support;

securing the locking device to the support by its own fastening means; and putting in place the fastening element in the bore of the support so that at least one locking shape of the moveable end interacts with the external shapes of the driving surface to stop the fastening element from rotating about the fastening axis.

* * * * *